United States Patent
Lee et al.

(10) Patent No.: US 9,740,037 B2
(45) Date of Patent: Aug. 22, 2017

(54) LIQUID CRYSTAL DISPLAY DEVICE

(71) Applicant: SAMSUNG DISPLAY CO., LTD., Yongin, Gyeonggi-Do (KR)

(72) Inventors: Yun-Gun Lee, Asan-si (KR); Min Wook Park, Asan-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 0 days.

(21) Appl. No.: 14/656,940

(22) Filed: Mar. 13, 2015

(65) Prior Publication Data

US 2016/0077376 A1    Mar. 17, 2016

(30) Foreign Application Priority Data

Sep. 15, 2014   (KR) .................. 10-2014-0122281

(51) Int. Cl.
*G02F 1/1339*    (2006.01)
*G02F 1/1333*    (2006.01)
*G02F 1/1335*    (2006.01)
*G02F 1/1337*    (2006.01)

(52) U.S. Cl.
CPC ...... *G02F 1/133512* (2013.01); *G02F 1/1337* (2013.01); *G02F 1/1339* (2013.01); *G02F 1/13394* (2013.01); *G02F 1/133514* (2013.01)

(58) Field of Classification Search
CPC ......... G02F 1/133512; G02F 1/133514; G02F 1/1337; G02F 1/1339; G02F 1/13394
USPC ................................................ 349/110, 153
See application file for complete search history.

(56) References Cited

U.S. PATENT DOCUMENTS

| 2009/0141205 | A1* | 6/2009 | Park ............... G02F 1/136204 349/40 |
| 2011/0255039 | A1* | 10/2011 | Enomoto ......... G02F 1/133305 349/113 |
| 2012/0099061 | A1* | 4/2012 | Lee ..................... G02B 5/22 349/110 |
| 2013/0154949 | A1* | 6/2013 | Jamshidi Roudbari . G06F 3/041 345/173 |
| 2013/0271704 | A1* | 10/2013 | Zhao ................. G02F 1/1339 349/97 |
| 2015/0055067 | A1* | 2/2015 | Kuramoto ......... G02F 1/13394 349/106 |

FOREIGN PATENT DOCUMENTS

| JP | 2005-091643 A | 4/2005 |
| KR | 10-2005-0044275 A | 5/2005 |
| KR | 10-2006-0019405 A | 3/2006 |
| KR | 10-2009-0052590 A | 5/2009 |
| KR | 10-2014-0032272 A | 3/2014 |

* cited by examiner

*Primary Examiner* — Nathanael R Briggs
(74) *Attorney, Agent, or Firm* — Lee & Morse, P.C.

(57) ABSTRACT

A liquid crystal display, including a display panel including an upper panel, a lower panel, and a liquid crystal layer interposed therebetween, the display panel being defined by a display area and a peripheral area, the display panel including a sealing member enclosing the display area and in the peripheral area, the upper panel including a light blocking member in the peripheral area, the light blocking member including a well.

19 Claims, 12 Drawing Sheets

LIQUID CRYSTAL DISPLAY DEVICE

CROSS-REFERENCE TO RELATED APPLICATION

Korean Patent Application No. 10-2014-0122281, filed on Sep. 15, 2014, in the Korean Intellectual Property Office, and entitled: "Liquid Crystal Display Device," is incorporated by reference herein in its entirety.

BACKGROUND

1. Field

Provided is a liquid crystal display.

2. Description of the Related Art

A liquid crystal display (LCD) is a flat panel displays (FPDs). A liquid crystal display (LCD) may generate electric fields by applying different voltages to pixel and common electrodes formed with a liquid crystal layer between an upper panel and a lower panel, light transmittance may be controlled by changing alignment of liquid crystal molecules, and an image may be displayed.

SUMMARY

Embodiments may be realized by providing a liquid crystal display, including a display panel including an upper panel, a lower panel, and a liquid crystal layer interposed therebetween, the display panel being defined by a display area and a peripheral area, the display panel including a sealing member enclosing the display area and in the peripheral area, the upper panel including a light blocking member in the peripheral area, the light blocking member including a well.

The well may overlap the sealing member.

The well may be between the display area and the sealing member.

The well may enclose the display area.

The upper panel may include a plurality of wells parallel to each other, and an outermost well may be inside an outermost part of the sealing member.

The upper panel may include an alignment layer, and the alignment layer may not be external to the outermost well.

The well may be continuous at a circumference of the display area.

The well may be disconnected at at least a portion of a circumference of the display area.

The lower panel may include a light blocking member overlapping the well.

The lower panel may include an opaque metal layer overlapping the well.

The well may have a linear or quadrangular shape, or a mix thereof.

The upper panel may include an alignment layer, and the alignment layer may not be external to the well.

The display panel may be a curved display panel.

The lower panel may include a color filter and a light blocking member in the display area.

The lower panel may include a column spacer on the light blocking member and including a same material as the light blocking member.

The lower panel may include at least one barrier in the peripheral area.

The barrier may include a same material as the color filter or the light blocking member.

The barrier may overlap the sealing member.

The barrier may be between the display area and the sealing member.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
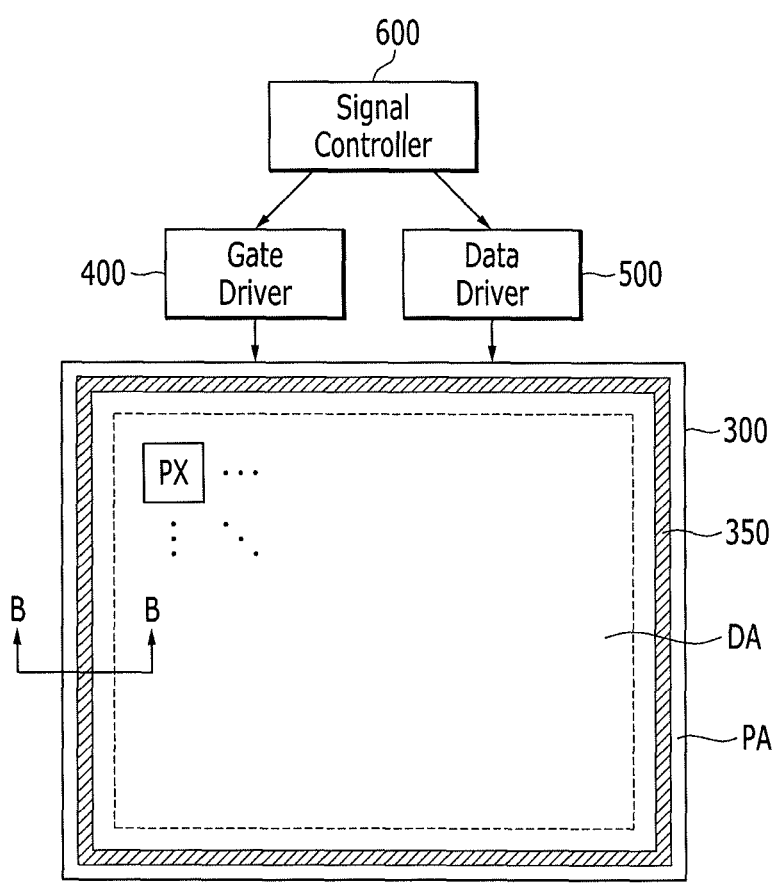
FIG. 1 illustrates a layout view of a liquid crystal display according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawings, the thickness or dimensions of layers, films, panels, regions, etc., may be exaggerated for clarity, and for better understanding and ease of description, the thicknesses of some layers and areas may be exaggerated. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present.

A liquid crystal display according to an exemplary embodiment will now be described in detail with reference to accompanying drawings.

FIG. 1 illustrates a layout view of a liquid crystal display according to an exemplary embodiment. Referring to FIG. 1, the liquid crystal display may include a display panel 300, a gate driver 400, a data driver 500, and a signal controller 600.

In a top plane structure, the display panel 300 may include a display area (DA) displaying an image and a peripheral area (PA) near the display area. In the drawing, an inside indicated by a dotted line quadrangle is the display area DA and outside thereof is the peripheral area PA. The display panel 300 may include an upper substrate and a lower substrate, and a liquid crystal layer interposed therebetween. The display panel 300 may include several elements to control alignment of liquid crystal molecules, and signal lines such as a gate line and a data line. The display panel 300 may be connected to the signal line and may include a plurality of pixels PX arranged in a matrix shape. The upper substrate and the lower substrate may be adhered by a sealing member (a seal) 350 positioned at the peripheral area PA.

To display the image by controlling the several elements of the display panel 300, the liquid crystal display may include the gate driver 400, the data driver 500, and the signal controller 600.

The gate driver 400 may be connected to the gate lines G1-Gn of the display panel 300 and may apply a gate-on voltage to the gate lines G1-Gn.

The data driver 500 may be connected to the data lines D1-Dm of the display panel 300 and may apply a data voltage corresponding to an image signal input from the outside to the data lines D1-Dm. The data driver 500 may covert the image data into the data voltage by using a gray voltage generated from a gray voltage generator.

The signal controller 600 may control the gate driver 400 and the data driver 500. The signal controller 600 may receive the image signal and the control signal thereof from the outside, may process the image signal to be suitable for operating conditions of the display panel 300 based on the control signal, and may then generate and output, for example, the image data, the gate control signal, the data control signal, and the clock signal.

The gate driver 400, the data driver 500, and the signal controller 600 may be directly mounted to the display panel 300 as an integrated circuit chip, may be mounted to a flexible printed circuit film to be adhered to the display panel 300 as a tape carrier package (TCP), or may be mounted to a separate printed circuit board (PCB). At least one of the gate driver 400 and the data driver 500 may be integrated with the display panel 300. At least two of the gate driver 400, the data driver 500, and the signal controller 600 may be integrated as one integrated circuit chip.

The entire configuration of the liquid crystal display has been schematically described. Hereafter, the structure of the display panel 300 is described in detail. Firstly, the display area DA of the display panel 300 is described with reference to FIGS. 2 to 4 while focusing on the pixel.

Figure 2:
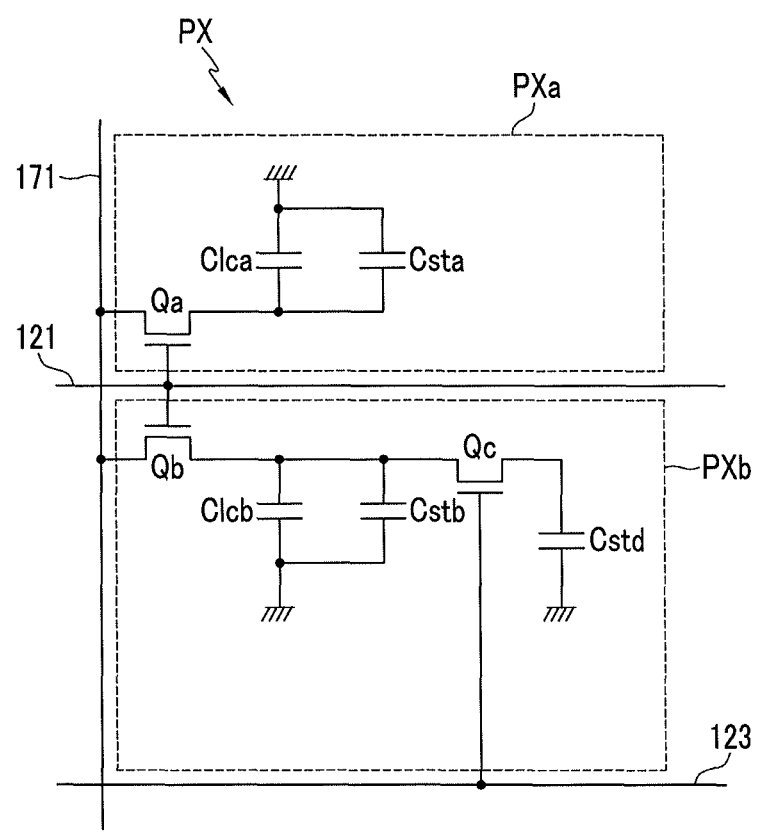
FIG. 2 illustrates an equivalent circuit diagram of one pixel of a liquid crystal display according to an exemplary embodiment.
Figure 3:
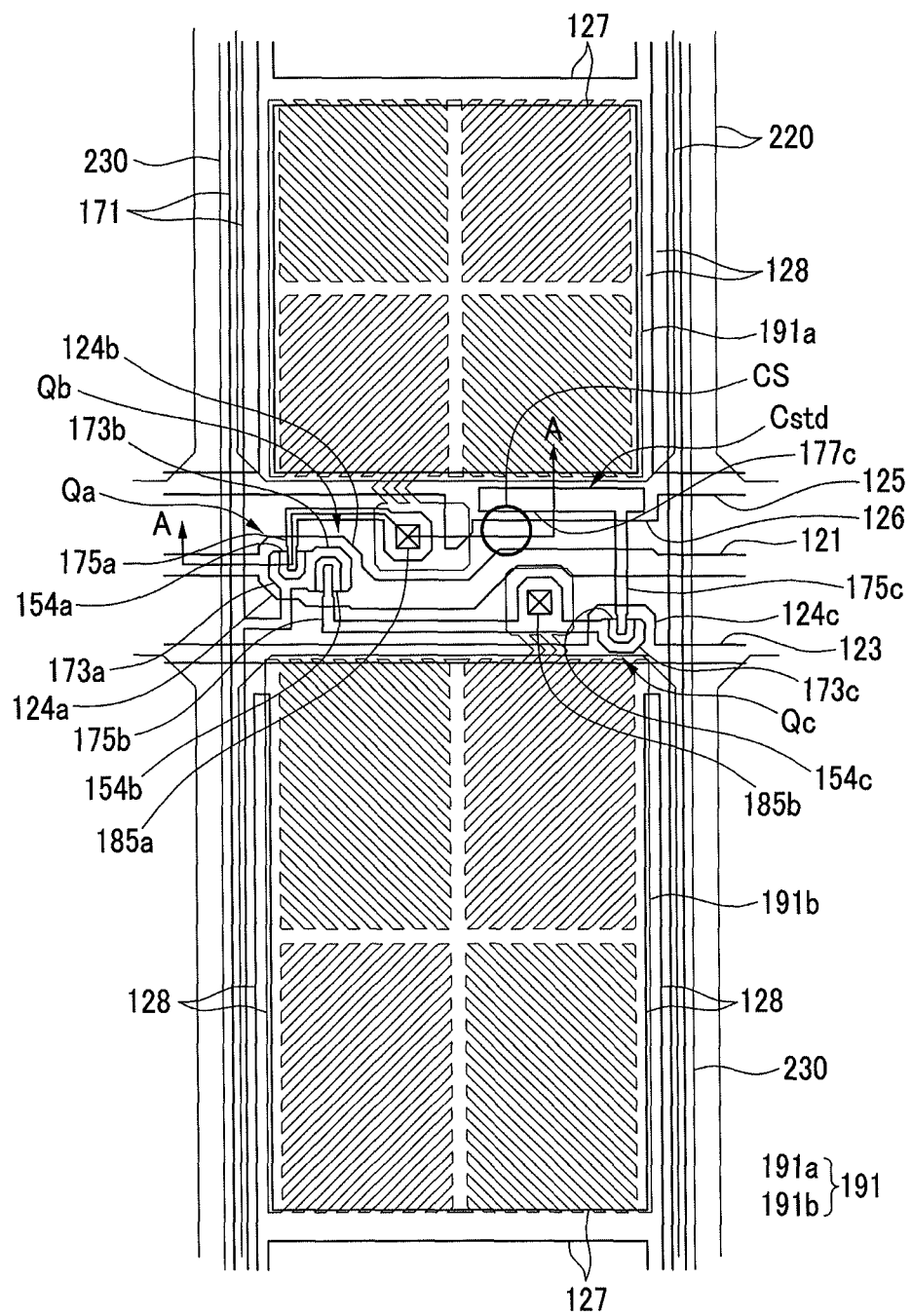
FIG. 3 illustrates a layout view of one pixel of a liquid crystal display according to an exemplary embodiment.
Figure 4:
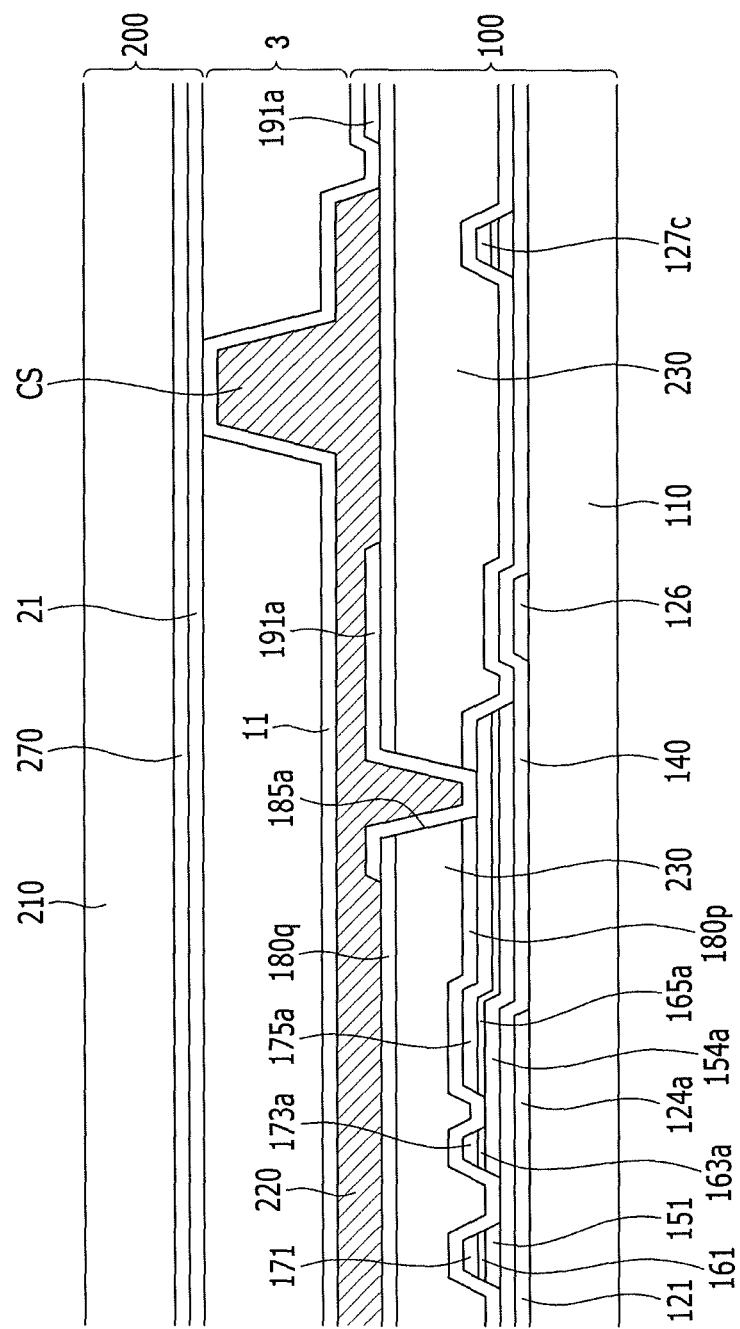
FIG. 4 illustrates a cross-sectional view taken along a line A-A in FIG. 3.

FIG. 2 illustrates an equivalent circuit diagram of one pixel of a liquid crystal display according to an exemplary embodiment, FIG. 3 illustrates a layout view of one pixel of a liquid crystal display according to an exemplary embodiment, and FIG. 4 illustrates a cross-sectional view taken along a line A-A in FIG. 3.

Referring to FIG. 2, the display panel 300 may include a signal line including a gate line 121, a step-down gate line 123, and a data line 171, and a pixel PX connected thereto.

Each pixel PX may include a first subpixel PXa and a second subpixel PXb. The first subpixel PXa may include a first thin film transistor Qa, a first liquid crystal capacitor Clca, and a first storage capacitor Csta. The second subpixel PXb may include a second thin film transistors Qb, a third thin film transistor Qc, a second liquid crystal capacitor Clcb, a second storage capacitor Cstb, and a step-down capacitor Cstd.

The first and second thin film transistors Qa and Qb may respectively be connected to the gate line 121 and the data line 171, and the third thin film transistor Qc may be connected to the step-down gate line 123. A control terminal of the first thin film transistor Qa may be connected to the gate line 121, an input terminal thereof may be connected to the data line 171, and a output terminal thereof may be connected to the first liquid crystal capacitor Clca and the first storage capacitor Csta. A control terminal of the second thin film transistor Qb may be connected to the gate line 121, an input terminal thereof may be connected to the data line 171, and an output terminal thereof may be connected to the second liquid crystal capacitor Clcb and the second storage capacitor Cstb. A control terminal of the third thin film transistor Qc may be connected to the step-down gate line 123, an input terminal thereof may be connected to the second liquid crystal capacitor Clcb, and an output terminal thereof may be connected to the step-down capacitor Cstd. The step-down capacitor Cstd may be connected to a common voltage together with the output terminal of the third thin film transistor Qc.

An operation of the pixel PX will now be described. First, when the gate line 121 is applied with a gate-on voltage Von, the first and second thin film transistors Qa and Qb connected thereto are turned on, a data voltage of the data line 171 is applied to the first and second liquid crystal capacitors Clca and Clcb through the first and second thin film transistors Qa and Qb, and the first and second liquid crystal capacitors Clca and Clcb are charged with a difference between the data voltage and the common voltage. The step-down gate line 123 may be applied with a gate-off voltage.

Next, when the gate-off voltage is applied to the gate line 121 and the gate-on voltage is applied to the step-down gate line 123, the first and second thin film transistors Qa and Qb are turned off, the third thin film transistor Qc is turned on, and a charging voltage of the second liquid crystal capacitor Clcb connected to the output terminal of the second thin film transistor Qb may be accordingly dropped. In the case of a liquid crystal display driven by frame inversion, the charging voltage of the second liquid crystal capacitor Clcb may always be lower than that of the first liquid crystal capacitor Clca, and it may be possible to improve side visibility of the liquid crystal display by differentiating the charging voltages of the first and second liquid crystal capacitors Clca and Clcb.

Referring to FIG. 3 and FIG. 4, the display panel may include a lower panel 100 and an upper panel 200 that face each other, and a liquid crystal layer 3 interposed between the two panels 100 and 200.

The lower display panel 100 will be described first. A plurality of gate conductors including the gate line 121, the step-down gate line 123, and a storage electrode line 125 may be formed on a lower substrate 110 formed of a transparent insulating material such as glass.

The gate line 121 and the step-down gate line 123 may extend mainly in a horizontal direction, and may transmit a gate signal. The gate line 121 may include a first gate electrode 124a and a second gate electrode 124b, and the step-down gate line 123 may include a third gate electrode 124c. The first and second gate electrodes 124a and 124b may be connected to each other. The storage electrode line 125 may extend in the horizontal direction, and a predetermined voltage such as, for example, the common voltage, may be transmitted. The storage electrode line 125 may include a storage extension portion 126, a pair of vertical portions 128 upwardly extending substantially in parallel with the data line 171, and a horizontal portion 127 that connects the pair of vertical portions 128.

A gate insulating layer 140 may be positioned on the gate conductor, and a semiconductor 151 may be positioned on the gate insulation layer 140. The semiconductor 151 may include a first semiconductor 154a and a second semiconductor 154b that are connected to each other while mainly extending toward the first and second gate electrodes 124*a* and 124*b*, and a third semiconductor 154*c* connected to the second semiconductor 154*b*.

An ohmic contact 161 may be formed on the semiconductor 151, and ohmic contacts 163*a* and 165*a* may be formed on the first semiconductor 154*a*. Ohmic contacts (not illustrated) may be respectively formed on the second and third semiconductors 154*b* and 154*c*.

A data conductor including the data line 171, a first drain electrode 175*a*, a second drain electrode 175*b*, and a third drain electrode 175*c* may be formed on the ohmic contacts 163*a* and 165*a*. The data line 171 may include a first source electrode 173*a* and a second source electrode 173*b* that extend toward the first and second gate electrodes 124*a* and 124*b*. Rod-shaped end portions of the first and second drain electrodes 175*a* and 175*b* may partially be surrounded by the first and second source electrodes 173*a* and 173*b*. One wide end portion of the second drain electrode 175*b* may be elongated again, and a third source electrode 173*c* that is bent in a U-shape may be formed. A wide end portion 177*c* of the third drain electrode 175*c* may overlap the storage extension portion 126, the step-down capacitor Cstd may be formed, and a rod-shaped end portion thereof may partially be surrounded by the third source electrode 173*c*.

The first gate electrode 124*a*, the first source electrode 173*a*, and the first drain electrode 175*a* may form the first thin film transistor Qa together with the first semiconductor 154*a*. Similarly, the second gate electrode 124*b*, the second source electrode 173*b*, and the second drain electrode 175*b* may form the second thin film transistor Qb together with the second semiconductor 154*b*, and the third gate electrode 124*c*, the third source electrode 173*c*, and the third drain electrode 175*c* may form the third thin film transistor Qc together with the third semiconductor 154*c*.

A lower passivation layer 180*p* may be positioned on the data line 171, 175*a*, 175*b*, and 175*c* and exposed portions of the semiconductors 154*a*, 154*b*, and 154*c*, and a color filter 230 may be positioned on the lower passivation layer 180*p*. The lower passivation layer 180*p* may include an inorganic insulating layer such as a silicon nitride or a silicon oxide. The lower passivation layer 180*p* may prevent a pigment of the color filter 230 from flowing into the exposed portion of the semiconductors 154*a*, 154*b*, and 154*c*. The color filter 230 may extend in a vertical direction along with two adjacent two data lines 171.

An upper passivation layer 180*q* may be positioned on the color filter 230. The upper passivation layer 180*q* may include the inorganic insulating layer such as a silicon nitride or a silicon oxide. The second passivation layer 180*q* may prevent the color filter 230 from being lifted, may suppress contamination of the liquid crystal layer 3 by an organic material such as a solvent flowing from the color filter 230, and may prevent defects such as an afterimage which may be caused when a screen is driven. The lower passivation layer 180*p*, the color filter 230, and the upper passivation layer 180*q* may have a plurality of contact holes 185*a* and 185*b* respectively exposing the first drain electrode 175*a* and the second drain electrode 175*b*.

A pixel electrode 191 including a first subpixel electrode 191*a* and a second subpixel electrode 191*b* may be positioned on the upper passivation layer 180*q*. The pixel electrode 191 may be applied with a data voltage through the thin film transistors Qa and Qb controlled by the gate signal. The first sub-pixel electrode 191*a* may be applied with the data voltage applied from the first drain electrode 175*a* through the contact hole 185*a*, and the second sub-pixel electrode 191*b* may be applied with the data voltage applied from the second drain electrode 175*b* through the contact hole 185*b*.

A light blocking member 220 may be formed on the upper passivation layer 180*q*. The light blocking member 220 may be referred to as a black matrix.

A column spacer CS may be formed on the light blocking member 220. The column spacer CS may be formed of the same material as the light blocking member 220. The column spacer CS and the light blocking member 220 may be simultaneously formed by using a two-tone mask such as a transflective mask. If the column spacer CS to maintain the cell gap between the lower panel 100 and the upper panel 200 is formed at the lower substrate 110, in a curved display panel, a liquid crystal alignment failure, for example, due to a misalignment between the lower panel 100 and the upper panel 200, may be reduced, and a display quality failure such as a texture may be improved. The light blocking member 220 may include a sub-column spacer (not shown) having a lower height than the column spacer CS, and the sub-column spacer may be formed when forming the light blocking member 220.

A lower alignment layer 11 may be formed on the subpixel electrodes 191*a* and 191*b*. The alignment layer 11 may include at least one among a polymer-based material, for example, polyimide, polyamic acid, polysiloxane, nylon, polyvinyl alcohol, and PVC. As a method for forming the alignment layer 11, as an example, a solution of polyamic acid synthesized by reacting a diamine compound and an anhydride in a solvent may be coated by a printing method (e.g., inkjet printing), dried, heated, and hardened, and a polyimide-based alignment layer may be formed.

Next, referring to the upper panel 200, a common electrode 270 may be positioned on an upper substrate 210 made of a transparent insulating material such as glass. The common electrode 270 may be made of a transparent conductive oxide (TCO) material such indium tin oxide (ITO) and indium zinc oxide (IZO).

An upper alignment layer 21 may be formed on the common electrode 270. The upper alignment layer 21 may be formed with the same material and the same method as the lower alignment layer 11.

The first sub-pixel electrode 191*a* and the common electrode 270 may form the first liquid crystal capacitor Clca along with the liquid crystal layer 3 interposed therebetween, and the second sub-pixel electrode 191*b* and the common electrode 270 may form the second liquid crystal capacitor Clcb along with the liquid crystal layer 3 interposed therebetween. The first and second liquid crystal capacitors Clca and Clcb may maintain an applied voltage after the first and second thin film transistors Qa and Qb are turned off. The first and second sub-pixel electrodes 191*a* and 191*b* may overlap the storage electrode line 125, and the first and second storage capacitors Csta and Cstb may be formed.

Next, the peripheral area PA of the display panel 300 will be described with reference to FIG. 5 and FIG. 6.

Figure 5:
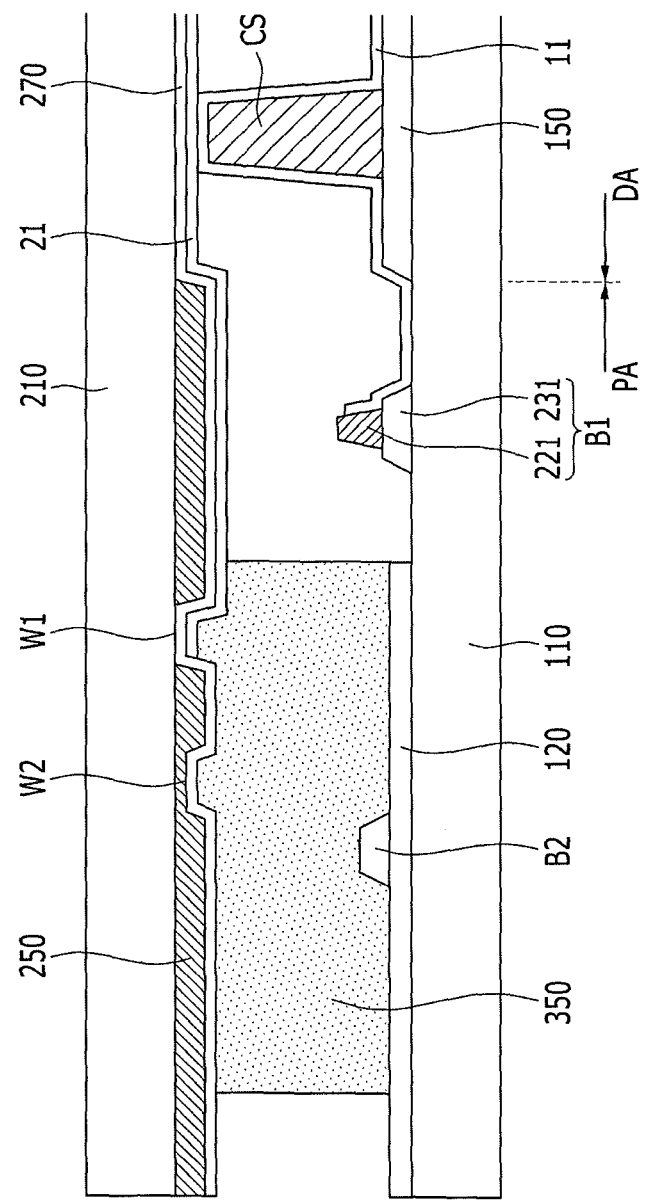
FIG. 5 and FIG. 6 illustrate cross-sectional views of the liquid crystal display of FIG. 1 taken along a line B-B.
Figure 6:
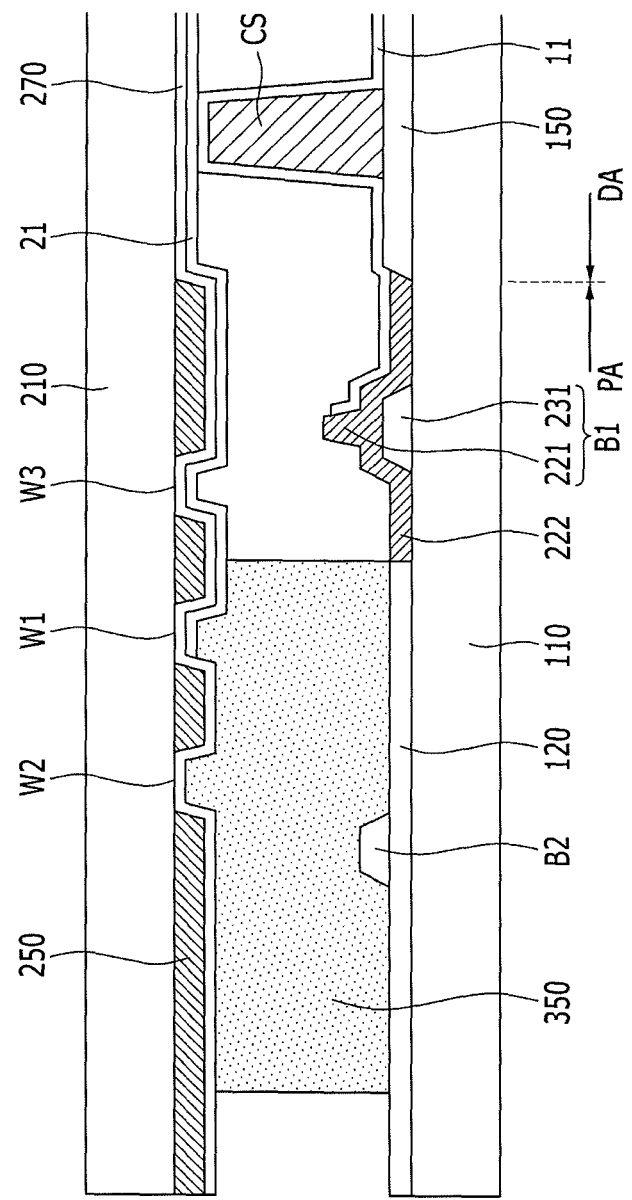

FIG. 5 and FIG. 6 illustrate cross-sectional views of the liquid crystal display of FIG. 1 taken along a line B-B. Referring to FIG. 5, a sealing member 350 may be positioned at the peripheral area PA where the lower panel 100 and the upper panel 200 face each other. The sealing member 350 may take the form of a looped line at a periphery of the display area DA. The sealing member 350 may combine the lower panel 100 and the upper panel 200. The sealing member 350 may prevent the liquid crystal material from being discharged outside the panel or impurities such as moisture and oxygen from penetrating into the liquid crystal layer 3 from the outside.

The sealing member 350 may be formed by coating a sealing material, for example, on the lower panel 100 through a screen printing method, positioning the upper panel 200, and then irradiating a laser to a portion on which the sealing material is coated. The coated sealing material may be a frit in a solid state. If the laser is irradiated to the sealing material, the sealing material may be melted and adhered to the lower substrate 100 and the upper substrate 200 like an adhesive, and may be hardened in the state that the sealing material is adhered to the lower substrate 100 and the upper substrate 200 to become the sealing member 350 and combine the lower substrate 100 and the upper substrate 200. In an embodiment, according to a characteristic of the sealing material, if the laser is irradiated, for example, a sealing material of a gel state may be hardened, and the sealing member 350 may be formed.

A gate metal layer 120 may be formed on the lower substrate 110, and a barrier (B1 and B2) may be formed. The barrier may prevent an aligning agent from being spread into the peripheral area PA when forming the aligning agent for forming the lower alignment layer 11, and may be formed to enclose the display area DA like the sealing member 350.

At least one barrier may be positioned at the lower substrate 110 or may be positioned between the sealing member 350 and the display area DA like the barrier B1, or inside the sealing member 350 like the barrier B2. The barrier B2 may be formed for a case that the aligning agent overflows and flows out of the barrier B1, and may be positioned at an approximate center of the width of the sealing member 350 or closer to the display area DA. The barrier B2 may define a spread margin of the aligning agent that may be permitted in the design.

The barrier may be formed of a single layer or a plurality of layers. The single layer may be simultaneously formed with the same material when forming the color filter 230 of the display area DA, or may be simultaneously formed with the same material when forming the light blocking member 220. The plurality of layers may include a lower layer 231 that is simultaneously formed with the same material when forming the color filter 230, and an upper layer 221 that is simultaneously formed with the same material when forming the light blocking member 220. When forming the barrier along with the light blocking member 220, the two-tone mask may be formed like the formation of the column spacer CS to have a higher height than the light blocking member 220.

A light blocking member 250 may be formed on the upper substrate 210. The light blocking member 250 may be formed to prevent light leakage in the peripheral area PA or light reflection by the metal layer. In the display area PA, the light blocking member 220 may be formed at the lower substrate 110, and it may not be necessary to form the light blocking member 250 at the display area PA of the upper substrate 210.

Wells W1 and W2 may be formed at the light blocking member 250. The wells W1 and W2 may be portions where at least a portion of the light blocking member 250 is removed. For example, the wells may be formed by completely removing the light blocking member 250 to the upper substrate 210 like the well W1, or may be formed of a recess portion by partially removing the light blocking member 250 like the well W2 to have a step from the light blocking member 250. The well W1 may be defined by the upper substrate 210 and the light blocking member 250, and the well W2 may be defined by the recess portion of the light blocking member 250.

The wells W1 and W2 may be formed to substantially enclose the display area DA. When coating the alignment layer to form the upper alignment layer 21, the wells W1 and W2 may hold the aligning agent that is spread into the sealing member region, and spread of the aligning agent may be suppressed. The aligning agent received by the well W1 may be spread over the light blocking member 250 between the wells W1 and W2, and the well W2 may receive that aligning agent. The wells W1 and W2 may be simultaneously formed without an additional mask when forming the light blocking member 250 at the upper substrate 110.

Although FIG. 5 shows two wells W1 and W2, the light blocking member 250 may include one or more wells. Each well may continuously extend at the circumference of the display area DA or may be formed to be disconnected at at least one portion. When the wells W1 and W2 are formed at the region in which the sealing member 350 is positioned, light leakage may be generated through the wells W1 and W2. Light leakage may be prevented by forming the gate metal layer 120 that is opaque at the region of the lower substrate 110 corresponding to the wells W1 and W2 or by forming the sealing member 350 made of the opaque material. The well W2 disposed farthest away from the display area DA may be positioned at the approximate center of the width of the sealing member 350 or closer to the display area DA. The well W2 may define the aligning agent spread margin to be permitted in the design.

The well W1 and the well W2 may be connected to each other through a portion in which the light blocking member 250 is removed, or may be separated. Variations of the well will be described later with reference to FIGS. 7 to 12.

The common electrode 270 may be positioned on the light blocking member 250. An overcoat (not shown) may be positioned between the light blocking member 250 and the common electrode 270.

A bottom surface of the sealing member 350 may contact the gate metal layer 120 positioned on the lower substrate 110, and a top surface thereof may contact the common electrode 270 positioned on the upper substrate 210. The common electrode 270 may be electrically connected to the gate metal layer 120 through a conductive ball (not shown) included in the sealing member 350 to receive the common voltage. The several thin films formed at the display area DA described related to FIG. 4 are simply indicated by one layer 150 in FIG. 5.

FIG. 6 is similar to the exemplary embodiment of FIG. 5, however it shows an example in which a well W3 may be formed between the sealing member 350 and the display area DA. A light blocking member 222 may be formed at the region of the lower substrate 110 corresponding to the well, and light leakage through the well W3 may be prevented. The light blocking member 222 may be simultaneously formed when forming the light blocking member 220 of the display area PA. The upper layer 221 of the first barrier B1 may be positioned on the light blocking member 222, and may be formed together of the same material as the light blocking member 220.

The lower panel 100 and the upper panel 200 may be combined by the sealing member 350 after forming the alignment layers 11 and 21, the alignment layers 11 and 21 may be formed at the region where the sealing member 350 is positioned, the adherence between the sealing member 350 and the alignment layers 11 and 21 may be relatively weak, and the adherence force between these panels 100 and 200 may be deteriorated. In a curved display panel, the stress of the sealing member 350 may be increased compared with that of the flat display panel, and the adherence of the sealing member 350 may be an important factor in the curved display panel. If the adherence of the sealing member 350 is deteriorated, the lower panel 100 and the upper panel 200 may be easily and frequently separated in a curved display panel.

As described above, in the peripheral area PA of the display panel, the barriers B1 and B2 of the lower substrate 110 and the wells W1 and W2 formed at the upper substrate 210 may help minimize or suppress the aligning agent for forming the lower and upper alignments layers 11 and 21 from being spread, to the region where the sealing member 350 is positioned. The area of the sealing member 350 contacting the alignment layers 11 and 21 may be minimized, and the adherence of the sealing member 350, for example, due to the contact with the alignment layers 11 and 21, may be prevented from being deteriorated.

When the spread of the aligning agent is not controlled, to help minimize overlapping of the sealing member and the alignment layer, the width of the peripheral area PA may be increased. By controlling the spread of the aligning agent according to an exemplary embodiment, the width of the peripheral area PA may be reduced and a bezel width may be reduced.

Next, several examples of the shape of the well controlling the spread of the aligning agent in the upper panel will be described.

Figure 7:
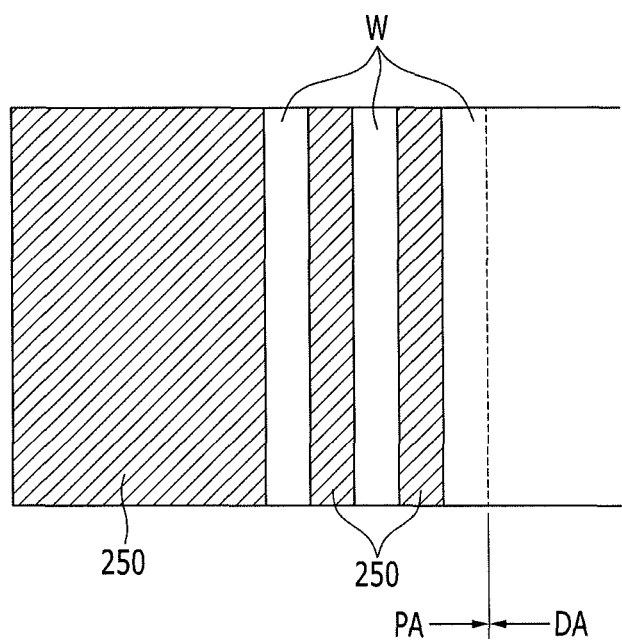
FIG. 7 to FIG. 12 illustrate examples of a well shape formed in a light blocking member of an upper panel.
Figure 8:
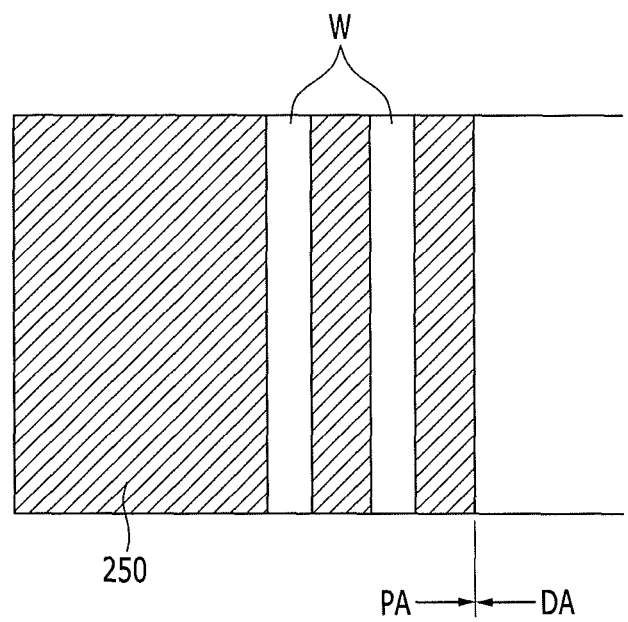
Figure 9:
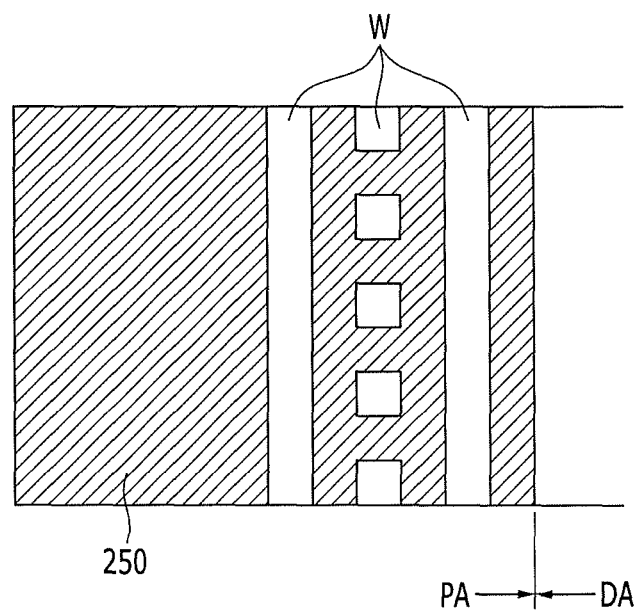
Figure 10:
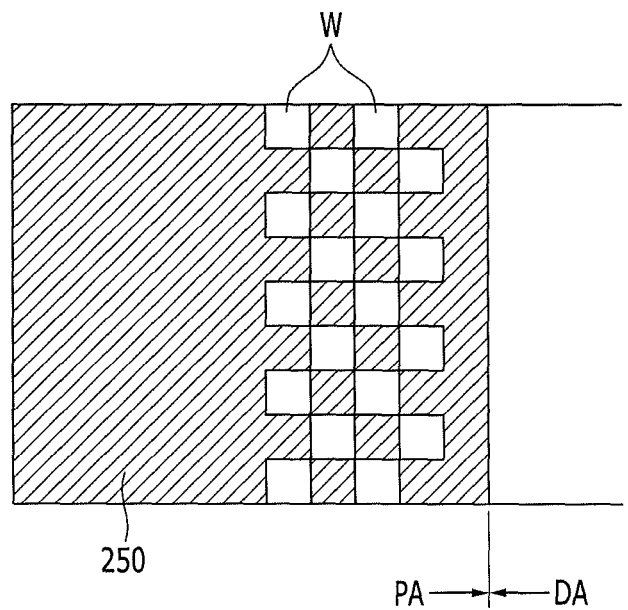
Figure 11:
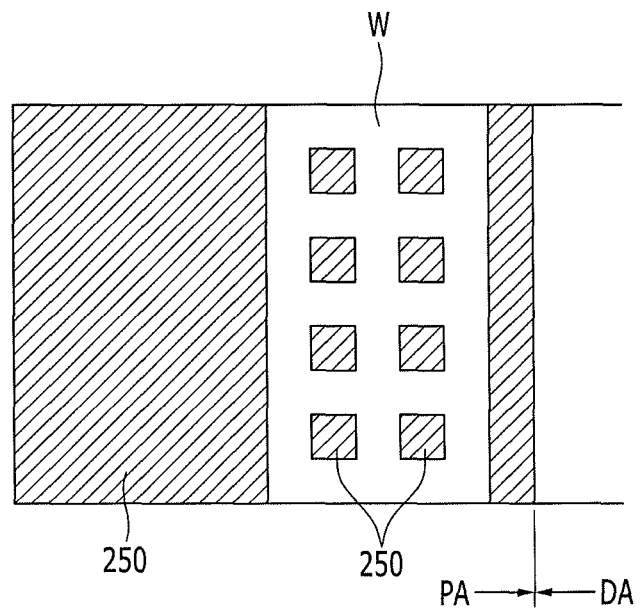
Figure 12:
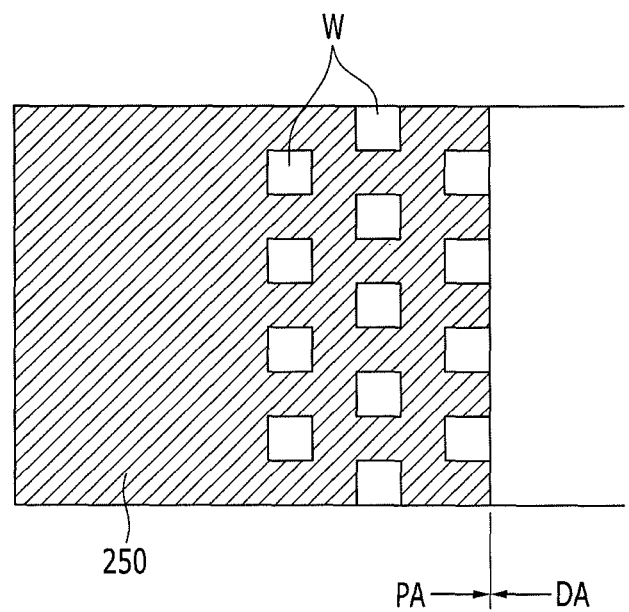

FIG. 7 to FIG. 12 illustrate examples of a well shape formed in a light blocking member of an upper panel. Referring to FIG. 7 to FIG. 12, the well W formed by the portion of the light blocking member 250 may be patterned with various shapes. As shown in FIG. 7, the well W may start from the boundary with the display area DA and may be formed at the peripheral area PA, and as shown in FIG. 8 to FIG. 12, the well W may be formed from a position far away from the boundary with the display area DA. The well W may be formed of a parallel belt shape, e.g., stripes, as shown in FIGS. 7 and 8, and as shown in FIG. 9 to FIG. 12, may include a disconnected quadrangle shape, or may be only formed of that quadrangle shape. FIG. 11 shows a shape in which the belt shape wells that are separated in parallel from each other are connected by the quadrangle wells therebetween.

The provided pattern may include a combination of the straight belt shape, e.g., stripes, and the quadrangle. In an embodiment, a curved line, an oblique line, or a circle, for example, may be combined, and various shapes controlling the spread of the aligning agent may be used.

By way of summation and review, a liquid crystal display panel may be divided into a display area in which the image may be displayed and an area peripheral thereto. In the peripheral area of a liquid crystal display panel, the upper panel and the lower panel may be combined by a sealing member enclosing the display area. Before the combination of the upper panel and the lower panel by the sealing member, a solution (heretofore referred to as an aligning agent) including an alignment layer formation material used to form an alignment layer arranging the liquid crystal molecules of the liquid crystal layer in a predetermined direction may be coated on the upper panel and the lower panel. The aligning agent may spread, and the alignment layer may also be formed in the peripheral area as well as the display area. At least a portion of the sealing member may be adhered to the alignment layer, which may be weak in adherence with the sealing member, according to the degree of spreading of the aligning agent. As the area of the sealing member adhered to the alignment layer is increased, the combination force of the upper panel and the lower panel may be deteriorated, and the upper panel and the lower panel may be separated.

As LCDs have become larger, curved display panels have also been developed to enhance immersion and realism of viewers. In a curved display panel, the stress of the sealing member may be increased compared with a flat display panel, and the adherence sealing member may be of increased importance.

A barrier formed of the color filter and the light blocking member and embossed on the substrate may control the spread of the aligning agent in the lower panel, and a depressed well at the light blocking member may control the spread of the aligning agent in the upper panel. By minimizing the region in which the sealing member and the alignment layer may contact each other through the control of the spread of the aligning agent, the combination of the lower panel and the upper panel, e.g., the adherence of the lower panel and the upper panel to each other, may not be deteriorated, and a curved display panel or bezel width may be minimized.

Light leakage that may be generated through a well formed at the light blocking member of the upper substrate may be prevented by the light blocking member or the sealing member formed at the corresponding position of the lower substrate.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A liquid crystal display, comprising:
    a display panel including an upper panel, a lower panel, and a liquid crystal layer interposed therebetween,
    the display panel being defined by a display area and a peripheral area, the display panel including a sealing member enclosing the display area and in the peripheral area,
    the upper panel including a light blocking member in the peripheral area and an alignment layer, the light blocking member including one or more wells, wherein at least one well of the one or more wells overlaps the alignment layer, and
    the upper panel including a common electrode, the common electrode overlapping the one or more wells,
    wherein at least one well of the one or more wells is between the display area and the sealing member so as to not overlap or contact the sealing member.

2. The liquid crystal display as claimed in claim 1, wherein the well overlaps the sealing member.

3. The liquid crystal display as claimed in claim 1, wherein the well is between the display area and the sealing member.

4. The liquid crystal display as claimed in claim 1, wherein the well encloses the display area.

5. The liquid crystal display as claimed in claim 4, wherein the upper panel includes a plurality of wells parallel to each other, and an outermost well is inside an outermost part of the sealing member.

6. The liquid crystal display as claimed in claim 5, wherein the alignment layer is not external to the outermost well.

7. The liquid crystal display as claimed in claim 4, wherein the well is continuous at a circumference of the display area.

8. The liquid crystal display as claimed in claim 4, wherein the well is disconnected at at least a portion of a circumference of the display area.

9. The liquid crystal display as claimed in claim 1, wherein the lower panel includes a light blocking member overlapping the well.

10. The liquid crystal display as claimed in claim 1, wherein the lower panel includes an opaque metal layer overlapping the well.

11. The liquid crystal display as claimed in claim 1, wherein the well has a linear or quadrangular shape, or a mix thereof.

12. The liquid crystal display as claimed in claim 1, wherein the alignment layer is not external to the well.

13. The liquid crystal display as claimed in claim 1, wherein the display panel is a curved display panel.

14. The liquid crystal display as claimed in claim 1, wherein the lower panel includes a color filter and a light blocking member in the display area.

15. The liquid crystal display as claimed in claim 14, wherein the lower panel includes a column spacer on the light blocking member and including a same material as the light blocking member.

16. The liquid crystal display as claimed in claim 14, wherein the lower panel includes at least one barrier in the peripheral area.

17. The liquid crystal display as claimed in claim 16, wherein the barrier includes a same material as the color filter or the light blocking member.

18. The liquid crystal display as claimed in claim 16, wherein the barrier overlaps the sealing member.

19. The liquid crystal display as claimed in claim 16, wherein the barrier is between the display area and the sealing member.

* * * * *